United States Patent
Ishii et al.

(10) Patent No.: US 8,187,551 B2
(45) Date of Patent: *May 29, 2012

(54) METHOD AND APPARATUS FOR MANUFACTURING TRICHLOROSILANE

(75) Inventors: Toshiyuki Ishii, Yokkaichi (JP); Eiji Komai, Yokkaichi (JP); Harumi Satoh, Yokkaichi (JP)

(73) Assignee: Mitsubishi Materials Corporation, Tokyo (JP)

( * ) Notice: Subject to any disclaimer, the term of this patent is extended or adjusted under 35 U.S.C. 154(b) by 234 days.

This patent is subject to a terminal disclaimer.

(21) Appl. No.: 12/461,147

(22) Filed: Aug. 3, 2009

(65) Prior Publication Data
US 2010/0034721 A1 Feb. 11, 2010

(30) Foreign Application Priority Data
Aug. 5, 2008 (JP) ................................. 2008-201864

(51) Int. Cl.
*B01J 19/00* (2006.01)
*C01B 33/107* (2006.01)

(52) U.S. Cl. ........ 422/198; 422/202; 422/205; 422/228; 422/229; 423/342

(58) Field of Classification Search .................. 422/198, 422/202, 205, 228, 229; 423/342
See application file for complete search history.

(56) References Cited

U.S. PATENT DOCUMENTS 2,855,449 A * 10/1958 Owen ............................ 585/712
3,607,125 A * 9/1971 Kydd ............................. 422/625
3,945,805 A * 3/1976 Costello et al. ............... 422/208
6,846,473 B2 1/2005 Kirii et al.
2010/0034722 A1 * 2/2010 Ishii et al. ..................... 423/342

FOREIGN PATENT DOCUMENTS

JP 1-188414 7/1989
WO WO-02/12122 2/2002

OTHER PUBLICATIONS

U.S. Appl. No. 12/379,702, filed Feb. 26, 2009.

* cited by examiner

*Primary Examiner* — Jennifer A Leung
(74) *Attorney, Agent, or Firm* — Edwards Wildman Palmer LLP

(57) ABSTRACT

An apparatus 1 for manufacturing trichlorosilane includes a decomposition furnace 2 into which polymers and hydrogen chloride are introduced, the decomposition furnace 2 includes: a heating device 11 which heats an interior of the decomposition furnace 2; a reaction chamber 4 which is formed in the decomposition furnace; a center tube 3 which is inserted in the reaction chamber 4 along a longitudinal direction of the reaction chamber and has a lower-end opening portion 3a; raw-material-supply pipes 5 and 6 which supplies the polymer and the hydrogen chloride to the reaction chamber 4 at an exterior of the center tube 3; and a gas-discharge pipe 7 which leads out reacted gas from the center tube 3, the apparatus 1 further includes a fin 14 that leads the polymer and the hydrogen chloride to the lower-end opening portion 3a of the center tube 3 so as to stir the polymer and the hydrogen chloride.

2 Claims, 7 Drawing Sheets

METHOD AND APPARATUS FOR MANUFACTURING TRICHLOROSILANE

CROSS REFERENCE TO RELATED APPLICATIONS

This application is related to a co-pending application entitled: "APPARATUS FOR PRODUCING TRICHLOROSILANE AND METHOD FOR PRODUCING TRICHLOROSILANE" filed on even date herewith in the name of Toshiyuki Ishii et al. as a non-provisional application claiming priority to Japanese Patent Application No. 2008-201863; which application is assigned to the assignee of the present application and is incorporated by reference herein.

BACKGROUND OF THE INVENTION

1. Field of the Invention

The present invention relates to a method and an apparatus for manufacturing trichlorosilane by decomposing compounds (hereinbelow, referred to as "polymers") containing high-boiling chlorosilanes, which are generated in a polycrystalline silicon manufacturing process, a trichlorosilane manufacturing process, or a conversing process. In particular, the present invention relates to a method and an apparatus for manufacturing trichlorosilane by decomposing polymers that have been separated in a chlorination step, polymers that have been separated from an exhaust gas of a polycrystalline silicon reaction step, or polymers that have been separated in a conversion step producing trichlorosilane from silicon tetrachloride in the exhaust gas.

Priority is claimed on Japanese Patent Application No. 2008-201864, filed Aug. 5, 2008, the content of which is incorporated herein by reference.

2. Description of Related Art

The high-purity polycrystalline silicon that can be used as a semiconductor material is mainly manufactured by the Siemens process in which, for example, trichlorosilane (Si-HCl$_3$; abbreviated "TCS") and hydrogen are used as raw materials, a gas mixture thereof is introduced into a reactor and brought into contact with heated silicon rods, and silicon is deposited on the surfaces of the silicon rods due to the hydrogen reduction or thermal decomposition of the trichlorosilane at a high temperature. The high-purity trichlorosilane to be introduced into the reactor, for example, is manufactured by introducing metallurgical grade silicon and hydrogen chloride into a fluidized chlorination reactor to react them, chlorinating the silicon to produce crude TCS (chlorination step), and purifying the crude TCS by distillation into high purity TCS.

In the manufacture of polycrystalline silicon, the reactor exhaust gas includes, in addition to unreacted trichlorosilane and hydrogen chloride, by-products such as silicon tetrachloride (SiCl$_4$; STC) and chlorosilanes including, for example, tetrachlorodisilane (Si$_2$H$_2$Cl$_4$) and hexachlorodisilane (Si$_2$Cl$_6$) (refer to PCT International Publication WO 02/012122). The chlorosilanes having boiling point higher than that of silicon tetrachloride are referred to herein as "high-boiling chlorosilanes". Trichlorosilane is obtained by distillation of chlorosilanes including trichlorosilane which is generated in the conversion furnace from silicon tetrachloride and hydrogen in the exhaust gas (conversion step), and the trichlorosilane is reused. The gas produced in the chlorination reactor or the conversion furnace includes hydrogen chloride, silicon tetrachloride, and the high-boiling chlorosilanes in addition to trichlorosilane.

Conventionally, polymers which are separated and distilled from produced gas in the chlorination reactor or the conversion furnace and the reactor exhaust gas undergo a hydrolytic process and are then discarded. Thus, there is problem in that the hydrolytic and the waste disposal processes are costly.

A method is known in which the polymers generated in the manufacture of polycrystalline silicon are returned to a fluidized reactor, and then decomposed and used in the manufacture of trichlorosilane (refer to Japanese Unexamined Patent Application, First Publication No. H01-188414). However, in this method, because the silicon powder and polymers supplied to the fluidized reactor are mixed, there is a problem that the fluidity of the silicon powder is reduced and the conversion rate of the silicon powder to chlorosilanes is lowered.

SUMMARY OF THE INVENTION

The present invention solves the above problems in the conventional polycrystalline silicon manufacture, and provides a manufacturing method and a manufacturing apparatus in which polymers separated from a polycrystalline silicon manufacture process, a trichlorosilane manufacture process, or a conversion process are decomposed and converted into trichlorosilane.

According to the present invention, an apparatus for manufacturing trichlorosilane by decomposition reacting polymers with hydrogen chloride at a high temperature is provided with a decomposition furnace into which the polymers including high-boiling chlorosilanes generated in a polycrystalline silicon manufacture process, a trichlorosilane manufacture process, or a conversion process and hydrogen chloride are introduced. The decomposition furnace includes: a heating device which heats an interior of the decomposition furnace; a reaction chamber which is formed in the decomposition furnace; a center tube which is inserted in the reaction chamber along a longitudinal direction of the reaction chamber from an upper portion of the decomposition furnace and has a lower-end opening portion opposed to an inner-bottom surface of the decomposition furnace; a raw-material-supply pipe which supplies the polymer and the hydrogen chloride to an upper portion of the reaction chamber at an exterior of the center tube; and a gas-discharge pipe which leads reacted gas from an upper end portion of the center tube. The apparatus further includes a fin which is formed integrally with at least one of an outer peripheral surface of the center tube or an inner peripheral surface of the decomposition furnace. The fin leads the polymer and the hydrogen chloride to the lower-end opening portion of the center tube so as to stir the polymer and the hydrogen chloride.

In the apparatus for manufacturing trichlorosilane, trichlorosilane is produced by decomposing polymers. Therefore, for example, it is possible to recover trichlorosilane by decomposing polymers which are separated in a polycrystalline silicon manufacturing process. Accordingly, it is possible to significantly reduce the load incurred due to carrying out waste disposal by hydrolytic the polymers. Furthermore, it is possible to increase the consumption efficiency of raw materials by recycling the recovered trichlorosilane. Therefore, it is possible to reduce the polycrystalline silicon manufacturing cost. In this case, the polymers and the hydrogen chloride are supplied to an upper surface of the fin at the upper portion of the reaction chamber, and are led to the inner-bottom portion along the fin while being stirred. Therefore, the polymers and the hydrogen chloride are heated efficiently since the heat is conducted from the fin, meanwhile, the temperature in the furnace can be uniformed. As a result, the polymers and the hydrogen can be reacted with high efficiency. Though silicon oxide is generated since oxide included in the polymers reacts with moisture in the hydrogen chloride gas, the center tube can be prevented from being clogged due to the silicon oxide since the silicon oxide is generated at comparatively large space around the center tube. Therefore, the silicon oxide rarely inhibits the operation of the decomposition furnace. Furthermore, although the silicon oxide slightly adheres to the inner surface of the lower-end opening portion of the center tube, the silicon oxide can be easily removed by inserting a stick or the like into the inside of the center tube since the center tube is provided vertically.

In the apparatus for manufacturing trichlorosilane according to the present invention, it is preferable that the center tube be provided so as to be extended above the decomposition furnace; and the raw-material-supply pipe surrounds the center tube at an exterior of the decomposition furnace, and forms a double pipe with the center tube.

The gas after the reaction that is discharged from the decomposition furnace through the center tube is highly-heated. Therefore, the polymers and the hydrogen chloride flowing through the raw-material-supply pipe are thermally exchanged with the highly-heated reacted gas via the wall of the center tube. As a result, the polymers and the like can be preheated before being introduced into the decomposition furnace, and the reaction efficiency can be increased.

In the apparatus for manufacturing trichlorosilane according to the present invention, it is preferable that the apparatus further have a pressurized-gas injection pipe which injects a pressurized gas into the decomposition furnace, and a discharge pipe which discharges a fluid in the decomposition furnace purged by the pressurized gas.

Though the silicon oxide which is generated by the reaction is adhered to the decomposition furnace, it is possible to clean the inner of the decomposition furnace by injecting the pressurized gas continuously or intermittently into the decomposition furnace so as to purge the adhered silicon oxide. Inactive gas, nitrogen gas, and the like can be used as the pressurized gas.

In the apparatus for manufacturing trichlorosilane according to the present invention, it is preferable that a plurality of rolling members be provided at an inner-bottom portion of the reaction chamber.

The silicon oxide is easy to accumulate on the inner-bottom portion of the decomposition furnace. The silicon oxide can be broken by rolling the rolling members, for example, by inserting a rod or the like from the outside, and then the silicon oxide can be easily removed.

According to the present invention, trichlorosilane is manufactured by decomposition reacting polymers with hydrogen chloride at a high temperature. In the method for manufacturing trichlorosilane, the polymers include high-boiling chlorosilanes generated in a polycrystalline silicon manufacture process, a trichlorosilane manufacture process, or a conversion process. The polymers and the hydrogen chloride are introduced into a decomposition furnace and are reacted. The manufacturing method according to the present invention includes: heating the decomposition furnace; supplying the polymers and the hydrogen chloride to the decomposition furnace from an upper portion thereof so as to react the polymers and the hydrogen chloride by leading to an inner-bottom portion of the decomposition furnace while stirring; and discharging a reacted gas from the inner-bottom portion upwardly above the decomposition furnace through a center of the decomposition furnace.

According to the present invention, trichlorosilane is produced by decomposing polymers. Therefore, for example, it is possible to recover trichlorosilane by decomposing polymers which are separated in a polycrystalline silicon manufacturing process, a trichlorosilane manufacturing process, or a conversion process. Therefore, it is possible to significantly reduce the load due to carrying out waste disposal by hydrolytic the polymers. In addition, it is possible to increase the consumption efficiency of raw materials by recycling the recovered trichlorosilane. As a result, it is possible to reduce the polycrystalline silicon manufacturing cost. In this case, the polymers and the hydrogen chloride are supplied to an upper surface of the fin at the upper portion of the reaction chamber, and are led to the inner-bottom portion along the fin while being stirred. Therefore, the polymers and the hydrogen chloride are heated efficiently since the heat is conducted from the fin, meanwhile, the temperature in the furnace can be uniformed. As a result, the polymers and the hydrogen chloride can be reacted with high efficiency. Though silicon oxide is generated since oxidative product included in the polymers reacts with moisture in the hydrogen chloride gas, the center tube can be prevented from being clogged due to the silicon oxide since the silicon oxide is generated at comparatively large space around the center tube. Therefore, the silicon oxide rarely inhibits the operation of the decomposition furnace.

DETAIL DESCRIPTION OF THE INVENTION

Below, embodiments of the present invention will be explained with reference to drawings.

Figure 1:
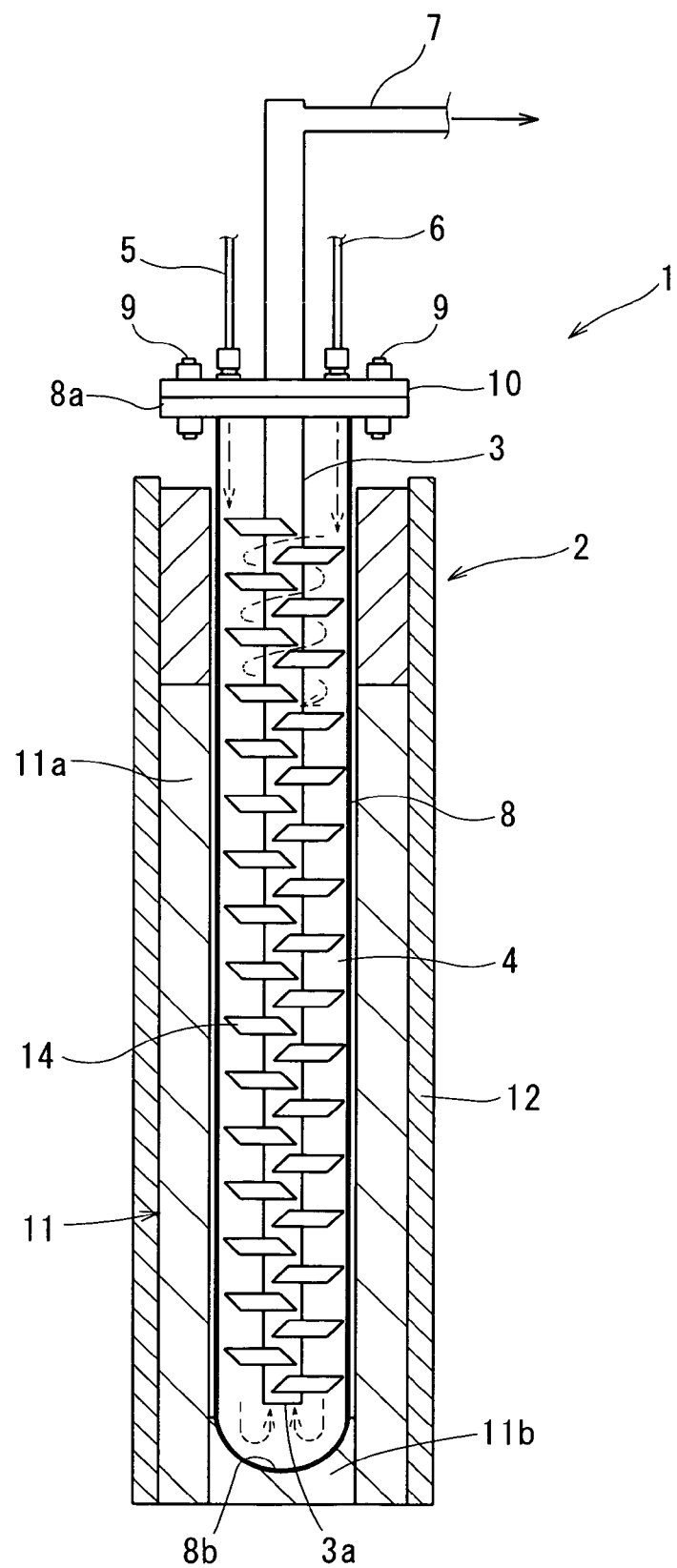
FIG. 1 is a vertical sectional view showing a first embodiment of a manufacturing apparatus for trichlorosilane according to the present invention.
Figure 2:
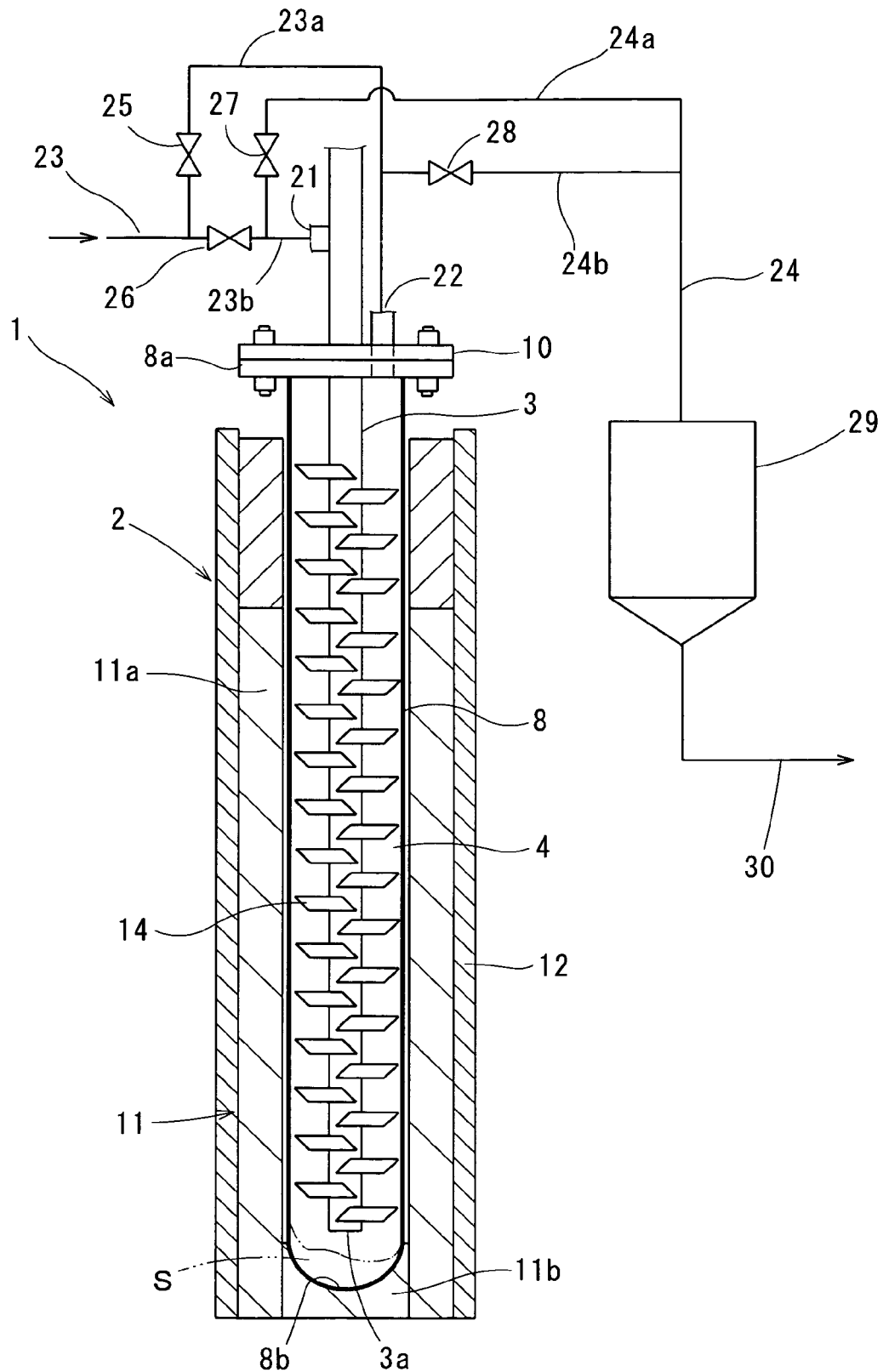
FIG. 2 is the other vertical sectional view showing the manufacturing apparatus for trichlorosilane viewed at 90° different angle from FIG. 1.

FIG. 1 to FIG. 3 show a first embodiment of a manufacturing apparatus for trichlorosilane. The manufacturing apparatus 1 is provided with: a decomposition furnace 2 which has a tube-shape and is disposed vertically; a center tube 3 which is inserted into the decomposition furnace 2 from an upper portion to an inner-bottom portion of the decomposition furnace 2 along a center axis thereof; a polymer-supply pipe 5 which supplies polymers to an upper portion of a reaction chamber 4 which is formed at an outside of the center tube 3; a hydrogen-chloride-supply pipe 6 to the upper portion of the reaction chamber 4; and a gas-discharge pipe 7 which discharges a reacted gas from an upper-end portion of the center tube 3.

The decomposition furnace 2 is configured with: a furnace body 8 which is formed as a tube-shape having a bottom and a upper flange 8a at an upper portion thereof; an end plate 10 which is detachably jointed to the upper flange 8a of the furnace body 8 by bolts 9; and a heating device 11 which is disposed around the furnace body 8 and heats an inside of the furnace body 8. An inner-bottom surface 8b of the furnace body 8 is formed as concave-spherical shell shape.

The heating device 11 is configured with a body heater 11a surrounding an outer peripheral surface of the furnace body 8, and a bottom heater 11b covering an outer-bottom surface of the furnace body 8. A reference number 12 in FIG. 1 and FIG. 2 denotes a frame which covers an outside of the heating device 11.

The center tube 3 is formed as a straight pipe, and fixed vertically to the end plate 10 of the decomposition furnace 2 so as to penetrate the end plate 10. The gas-discharge pipe 7 deriving the reaction gas is connected to an upper end portion of the center tube 3 protruding upward from the decomposition furnace 2. The reacted gas flows upwardly inside of the center tube 3, and is discharged outside through the gas-discharge pipe 7. The gas-discharge pipe 7 is connected to a gas cooler (not illustrated) which cools the high-temperature reacted gas and a gas suction device (not illustrated) which suctions the reacted gas. The center tube 3 is inserted into the furnace body 8 from the end plate 10 at the length slightly less than the depth of the furnace body 8. Therefore, when the end plate 10 is fixed to the upper flange 8a of the furnace body 8, the center tube 3 is disposed so that a lower-end opening portion 3a of the center tube 3 is slightly separated from the inner-bottom surface 8b of the furnace body 8.

The reaction chamber 4 is a tube-like space between an outer peripheral surface of the center tube 3 at a portion of being inserted into the decomposition furnace 2 and an inner peripheral surface of the furnace body 8a of the decomposition furnace 2. The fin 14 is fixed to the outer peripheral surface of the center tube 3 facing the reaction chamber 4. The fin 14 is formed, for example, spirally along a longitudinal direction of the center tube 3, and an outer peripheral end thereof is adjacent to the inner peripheral surface of the furnace body 8. An inside of the reaction chamber 4 is substantially partitioned as a spiral space since the gap between the outer peripheral end of the fin 14 and the inner peripheral surface of the furnace body 8 is set small.

As shown in FIG. 2, a communication hole 21 communicating with the inside of the center tube 3 is formed midway of a protruding portion of the center tube 3 upward from the end plate 10. Also, a communication hole 22 communicating with the reaction chamber 4 is formed at the end plate 10 other from the supply pipes 5 and 6. A pressurized-gas injection pipe 23 and a discharge pipe 24 of furnace fluid are connected to the communication hole 21 through branch pipes 23b and 24a. Also, the pressurized-gas injection pipe 23 and the discharge pipe 24 are connected to the communication hole 22 through branch pipes 23a and 24b. The pressurized-gas injection pipe 23 is provided in order to inject inactive gas, nitrogen gas and the like in a state of being pressurized into the center tube 3 or the reaction chamber 4 through either the communication hole 21 or the communication hole 22. Valves 25 and 26 are provided on the pressurized-gas injection pipe 23 in order to switch flow paths to either the center tube 3 or the reaction chamber 4. The discharge pipe 24 of the furnace fluid is provided in order to discharge the furnace fluid including the silicon oxide which is purged by injecting the pressurized gas, from the center tube 3 or the reaction chamber 4. Valves 27 and 28 are provided on the discharge pipe 24 in order to switch flow paths to either the center tube 3 or the reaction chamber 4. The discharge pipe 24 is connected to a cyclone separator 29. The silicon oxide is collected at the cyclone separator 29, and treated by a silicon oxide treating system 30.

The pressurized-gas injection pipe 23 and the discharge pipe 24 of the furnace fluid are clogged at the valves 25 to 28 while the decomposition furnace 2 is in operation. The valves 25 to 28 are opened, for example, for maintenance as aftermentioned in order to clean the inside of the decomposition furnace 2, and then the pressurized-gas injection pipe 23 and the discharge pipe 24 are utilized. Note, the communication hole 22 is separately provided from the polymer-supply pipe 5 and the hydrogen-chloride-supply pipe 6 shown in FIG. 1. However, at least one of the polymer-supply pipe 5 or the hydrogen-chloride-supply pipe 6 can be used as the communication hole 22.

Figure 4:
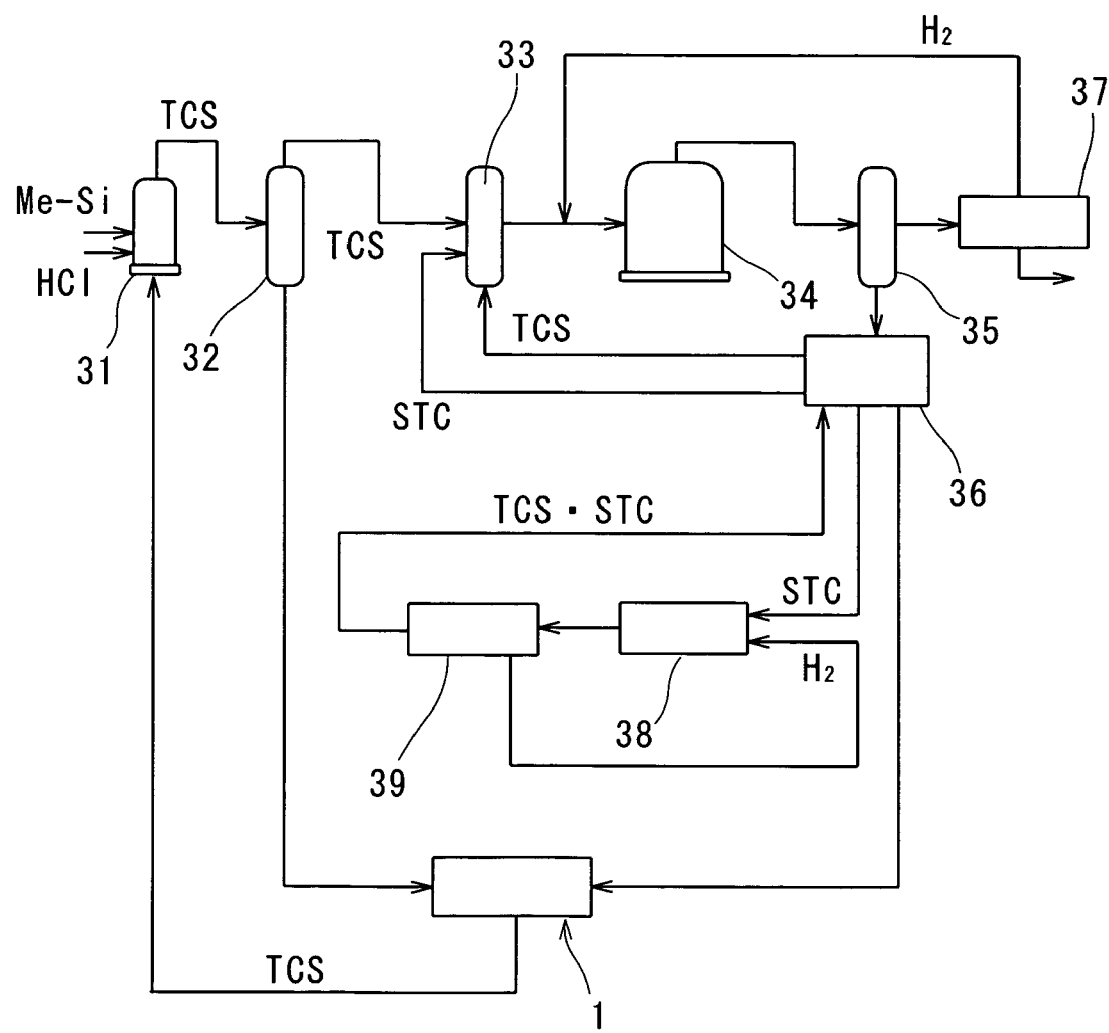
FIG. 4 is a flow diagram showing an example of a manufacturing process for polycrystalline silicon by the manufacturing apparatus for trichlorosilane according to the present invention.

Next, an example of polycrystalline silicon manufacturing process using the trichlorosilane manufacturing apparatus 1 will be explained with reference to FIG. 4. Hereinafter, trichlorosilane is referred as TCS, and silicon tetrachloride is referred as STC.

In the illustrated manufacturing process, a fluidized chlorination furnace 31 producing crude TCS by reacting metallurgical silicon (Me-Si) and hydrogen chloride (HCl); a distillation column 32 which distills produced gas including the crude TCS generated at the fluidized chlorination furnace 31; an evaporator 33 which evaporates refined high-purity TCS with STC and TSC which are recovered in a post-process; a reactor 34 which produces polycrystalline silicon from raw-material gas which is a mixture of hydrogen ($H_2$) and the gas supplied from the evaporator 33; and a condenser 35 which separates chlorosilanes from an exhaust gas of the reactor 34, are utilized.

The liquid chlorosilanes which are condensed and separated in the condenser 35 are introduced to a distillation system 36 including a plurality of distillation column, are distilled step-by-step in the distillation system 36, and are separated into TCS, STC, and polymers. The TCS and the STC which are recovered are returned to the evaporator 33, and reused as raw-material gas components. Gas educed from the condenser 35 includes hydrogen, hydrogen chloride, and the like, are introduced to a hydrogen recovering system 37, and then hydrogen is separated therefrom. The separated hydrogen is returned to the evaporator 33, and reused as a raw-material gas.

A part of the STC from the distillation system 36 is reacted with hydrogen ($H_2$) and converted to TCS in a conversion furnace 38. A hydrogen recovering equipment 39 recovers hydrogen from the reacted gas of the conversion furnace 38. The reacted gas of the hydrogen recovering equipment 39 includes TCS and STC, and is returned to the distillation system 36.

Note, STC is also added to the evaporator 33 and used as the raw-material gas of the polycrystalline silicon manufacture. However, STC is not always necessary to be added to the raw-material gas.

In a series of the manufacturing process, distillation residues which are separated from bottoms of the columns (i.e., the distillation column 32 after a chlorination process generating TCS, and the distillation columns of the distillation system 36 after the reaction process generating polycrystalline silicon or after the conversion process converting STC to TCS) includes polymers. The polymers are decomposed by the trichlorosilane manufacturing apparatus 1, and converted to TCS. The TCS obtained in such way is, for example, supplied to the fluidized chlorination furnace 31, and reused as material of producing polycrystalline silicon.

Next, a manufacturing method of TCS by decomposing polymers using the trichlorosilane manufacturing apparatus 1 will be explained.

The polymers which are separated in the distillation column 32 after the chlorination process or in the distillation system 36 after the reaction process or the conversion process include high-boiling chlorosilanes at substantially 20 to 40% by mass. Specifically, for example, the polymers include substantially; 1 to 3 mass % TCS; 50 to 70 mass % STC; 12 to 20 mass % $Si_2H_2Cl_4$; 13 to 22 mass % $Si_2Cl_6$; and 3 to 6 mass % other high-boiling chlorosilanes.

The polymers are introduced with hydrogen chloride into the decomposition furnace 2 of the trichlorosilane manufacturing apparatus 1. The ratio is preferably 100% polymers to 10 to 30 mass % hydrogen chloride. It is not preferable that the amount of hydrogen chloride exceed the above ratio since unreacted hydrogen chloride is increased. On the other, in a case in which the amount of the polymers exceeds the above ratio, a large amount of silicon powder is generated, so that a load for maintain the equipment increases, and operation efficiency is significantly deteriorated.

The polymers are reacted with hydrogen chloride at a high temperature of 450° C. or more and thereby converted to TCS. The temperature in the decomposition furnace 2, specifically, the temperature in the reaction chamber 4 is preferably 450° C. or more and 700° C. or less. When the temperature in the furnace is lower than 450° C., the decomposition of the polymers does not progress sufficiently. When the temperature in the furnace rises above 700° C., a reaction in which the produced TCS reacts with the hydrogen chloride to produce STC is progressed, and this is not preferable because the recovery efficiency of the TCS will be decreased.

The polymers includes high-boiling chlorosilanes having boiling point higher than that of STC, for example, tetrachlorodisilane ($Si_2H_2Cl_4$), hexachlorodisilane ($Si_2Cl_6$), and the like, and further includes TCS, STC, and the like. The decomposition process of the high-boiling chlorosilanes to TCS includes the following reactions.

(1) Decomposition of tetrachlorodisilane ($Si_2H_2Cl_4$)

$$Si_2H_2Cl_4 + HCl \rightarrow SiH_2Cl_2 + SiHCl_3$$

$$Si_2H_2Cl_4 + 2HCl \rightarrow 2SiHCl_3 + H_2$$

(2) Decomposition of hexachlorodisilane ($Si_2Cl_6$)

$$Si_2Cl_6 + HCl \rightarrow SiHCl_3 + SiCl_4$$

In these reactions, silicon oxide is deposited if moisture ($H_2O$) in hydrogen chloride reacts with trichlorosilane and silicon tetrachloride.

$$SiHCl_3 + 2H_2O \rightarrow SiO_2 + H_2 + 3HCl$$

$$SiCl_4 + 2H_2O \rightarrow SiO_2 + 4HCl$$

First, the inside of the decomposition furnace 2 is heated by the heating device 11, and the polymers and hydrogen chloride are supplied through the polymer-supply pipe 5 and hydrogen-chloride-supply pipe 6 therein. The polymers and hydrogen chloride fall down on the upper surface of the fin 14 from the upper portion of the reaction chamber 4, and flow down along the upper surface of the fin 14. In this case, the fin 14 is adjacent to the inner peripheral surface of the furnace body 8, and is highly-heated by the heating device 11 disposed on the outside the furnace body 8. Therefore, the polymers and hydrogen chloride are heated and evaporated by the heat, so that the polymers and hydrogen chloride are mixed. The gaseous fluid mixture flows down in the reaction chamber 4 since the inside of the decomposition furnace 2 is suctioned by the suction device. The fluid mixture flows down as a spiral flow along the fin 14 with being stirred since the fin 14 is formed spirally and disposed so as to partition substantially the inner space of the reaction chamber 4. Therefore, the fluid mixture is heated by the inner peripheral surface of the furnace body 8, the surface of the fin 14, and the like, so that the reaction is accelerated, and is led to the inner-bottom portion of the furnace body 8 so that TCS is produced. The lower-end opening portion 3*a* of the center tube 3 is opposed to the inner-bottom portion of the furnace body 8. The reacted gas is led from the lower-end opening portion 3*a* into the center tube 3, flows through the center tube 3, and is discharged from the upper gas-discharge pipe 7.

The produced gas including TCS that is discharged from the gas-discharge pipe 7 still includes hydrogen chloride. In order to use the hydrogen chloride for the chlorination, the produced gas is reused in the polycrystalline silicon manufacturing process by being introduced directly into the fluidized chlorination furnace 31 in the polycrystalline silicon manufacturing process (refer to FIG. 4), or being condensed so that the condensate thereof is introduced into the distillation column 32 after the chlorination process.

In the trichlorosilane manufacturing apparatus 1, the polymers and hydrogen chloride are supplied from the upper portion of the reaction chamber 4 so as to flow down on the fin 14, are mixed and evaporated on the surface of the fin 14, and are guided spirally along the fin 14 as shown by a broken line in FIG. 1. The fluid mixture of the polymers and hydrogen chloride is heated by the heating device 11 while moving along the fin 14 by receiving the heat of the inner peripheral surface of the furnace body 8 and the surface of the fin 15. Furthermore, the reaction chamber 4 is a long spiral path comparing with the vertical length thereof since the reaction chamber 4 is formed spirally by the fin 14. Therefore, the temperature distribution in the reaction chamber 4 is uniform, so that a high-efficiency reaction can be operated.

In manufacturing TCS in this manner, in a case in which the silicon oxide S deposits at the inner-bottom portion of the furnace body 8 as shown by a chain line in FIG. 2, the operation of the decomposition furnace 2 is stopped, and the pressurized gas such as inactive gas is injected from the pressurized-gas injection pipe 23. Consequently, the pressure of the pressurized gas breaks and crushes the deposition of the silicon oxide S on the inner-bottom portion. As a result, the silicon oxide S is blown off, and can be discharged outside with the furnace fluid from the discharge pipe 24 of furnace fluid.

Figure 3A:
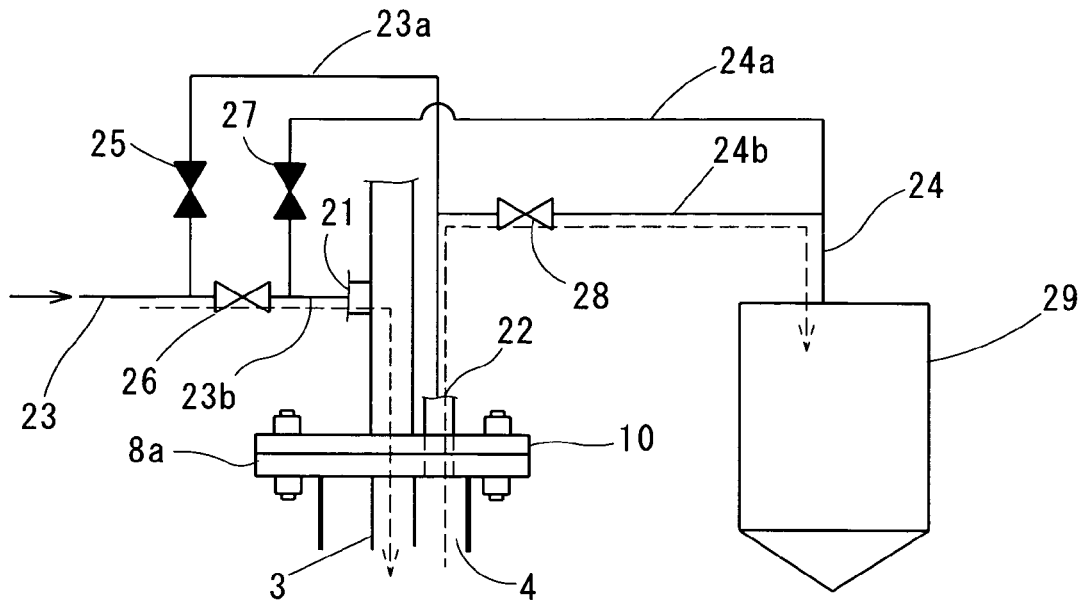
FIGS. 3A and 3B are schematic piping diagrams showing examples of discharging silicon oxide in a decomposition furnace using a pressurized-gas injection pipe showed in FIG. 2.
Figure 3B:
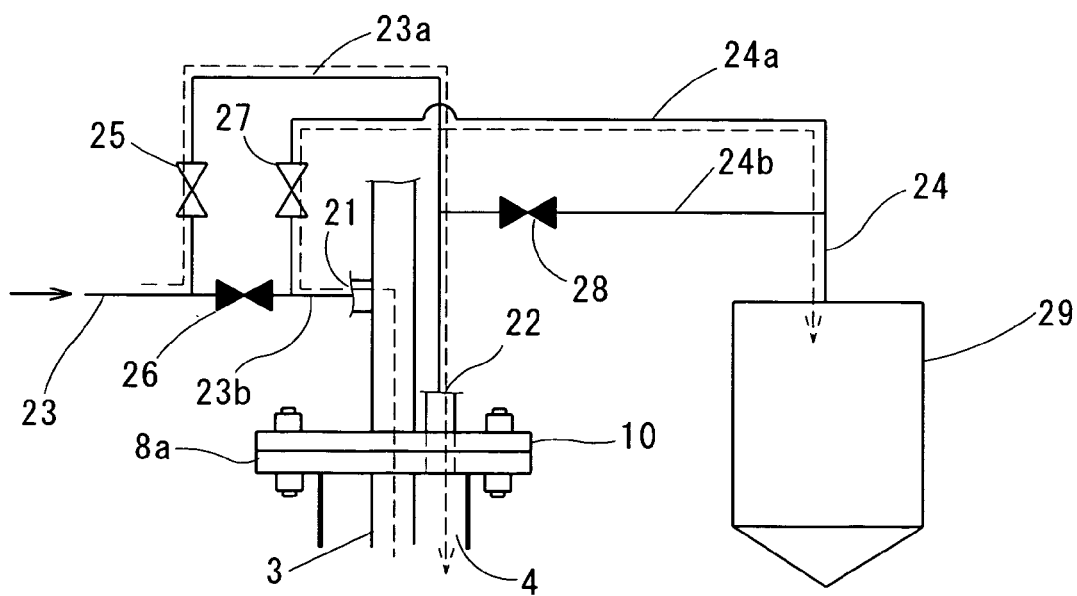

A discharge method of the silicon oxide will be explained with reference to FIGS. 3A and 3B. In FIGS. 3A and 3B, the valves painted black are closed, and the unpainted valves are opened. As shown in FIG. 3A, the valves 25 to 28 are operated. First, the valves 26 and 28 are opened and the valves 25 and 27 are closed to connect the pressurized-gas injection pipe 23 to the communication hole 21 of the center tube 3, and the communication hole 22 of the reaction chamber 4 is communicated with the discharge pipe 24 of the furnace fluid. Next, as shown by dotted lines in FIG. 3A, the pressurized gas is injected from center tube 3 into decomposition furnace 2 through the branch pipe 23*b* so that the silicon oxide S on the inner-bottom portion is flown while being broken and crushed. Then, the silicon oxide S is discharged from reaction chamber 4 to the cyclone separator 29 via the discharge pipe 24 of the furnace fluid. After a predetermined time, as shown in FIG. 3B, the states of the valves 25 to 28 are switched so that the pressurized gas is injected from the communication hole 22 of the reaction chamber 4, and the furnace fluid or the like are discharged from the communication hole 21 of the center tube 3, in the opposite direction from the case of FIG. 3A. The inside of the decomposition furnace 2 is cleaned by repeating those processes alternately. In this case, it is not always necessary to alternate the state shown in FIG. 3A and the state shown in FIG. 3B; the decomposition furnace 2 can be cleaned by either one of these states.

The discharged silicon oxide S is recovered by the cyclone separator 29, and is sent to the treating system 30. Although a quantity of the silicon oxide S is adhered to the center tube 3 inside the lower-end opening portion 3a, the silicon oxide S can be removed by the above-mentioned operation. In addition, since the center tube 3 is a straight tube, for example, it is easy to remove the silicon oxide S by inserting a rod-like tool from the upper portion.

Figure 5:
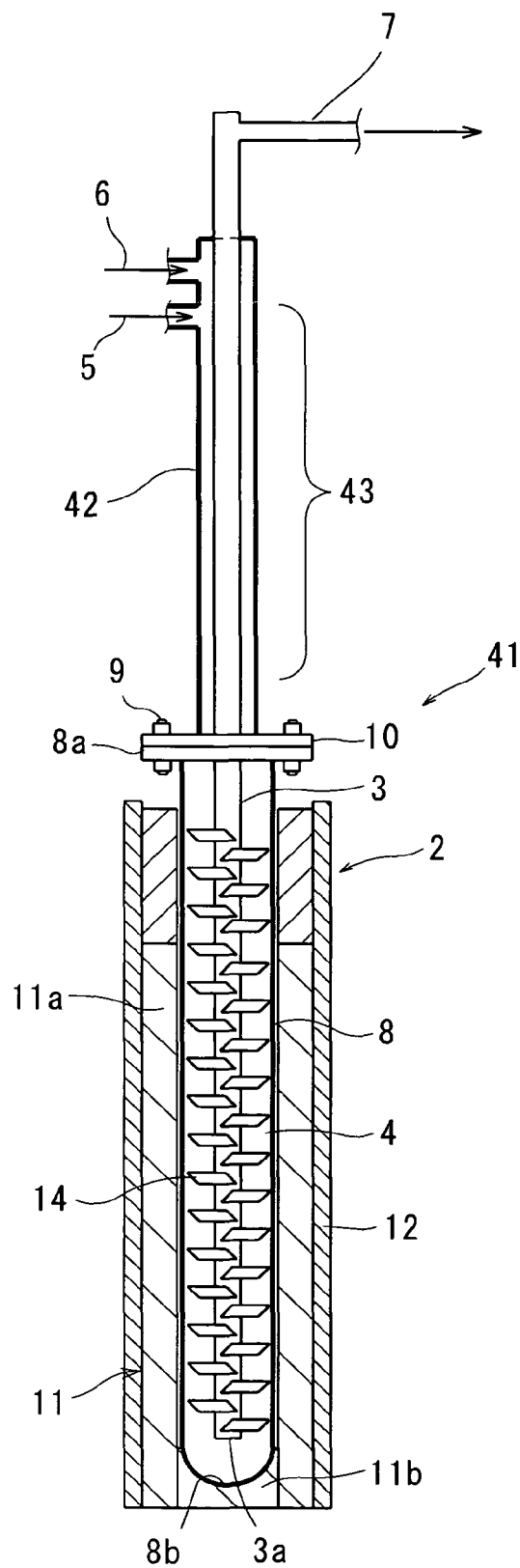
FIG. 5 is a vertical sectional view showing a second embodiment of a manufacturing apparatus for trichlorosilane according to the present invention.

FIG. 5 shows a second embodiment of a trichlorosilane manufacturing apparatus according to the present invention.

In the trichlorosilane manufacturing apparatus 1 of the first embodiment, the polymer-supply pipe 5 and the hydrogen-chloride-supply pipe 6 are connected to the end plate 10 of the decomposition furnace 2. In a trichlorosilane manufacturing apparatus 41 of the second embodiment, the center tube 3 is protruded upward from the decomposition furnace 2, and a material-mixing pipe 42 having a larger diameter than that of the center tube 3 is provided so as to cover the center tube 3 at the protruded portion from the decomposition furnace 2. That is, the material-mixing pipe 42 and the center tube 3 are arranged as a double-pipe. The double-pipe portion extends upward from the decomposition furnace 2 by a predetermined length. The polymer-supply pipe 5 and the hydrogen-chloride-supply pipe 6 are connected to the material-mixing pipe 42 which is provided at an upper end portion of the double-pipe. Therefore, the heat of the material fluid flowing through the material-mixing pipe 42 and the heat of the reacted gas flowing through the center tube 3 are exchanged at the double-pipe portion. That is, the double-pipe portion is a preheat device 43 of the material fluid. The other components are the same as those of the first embodiment, and the common parts are denoted by the same reference symbols and the explanations thereof are omitted.

In the trichlorosilane manufacturing apparatus 41, the polymers and hydrogen chloride which are introduced in the material-mixing pipe 42 are mixed, and heated at the preheat device 43 by the reacted gas which is discharged from the decomposition furnace 2 and paths through the center tube 3. The polymers and hydrogen chloride are evaporated and gasified, so that the gaseous fluid mixture is introduced into the reaction chamber 4. Accordingly, the efficient reaction in the reaction chamber 4 can be realized.

Figure 6:
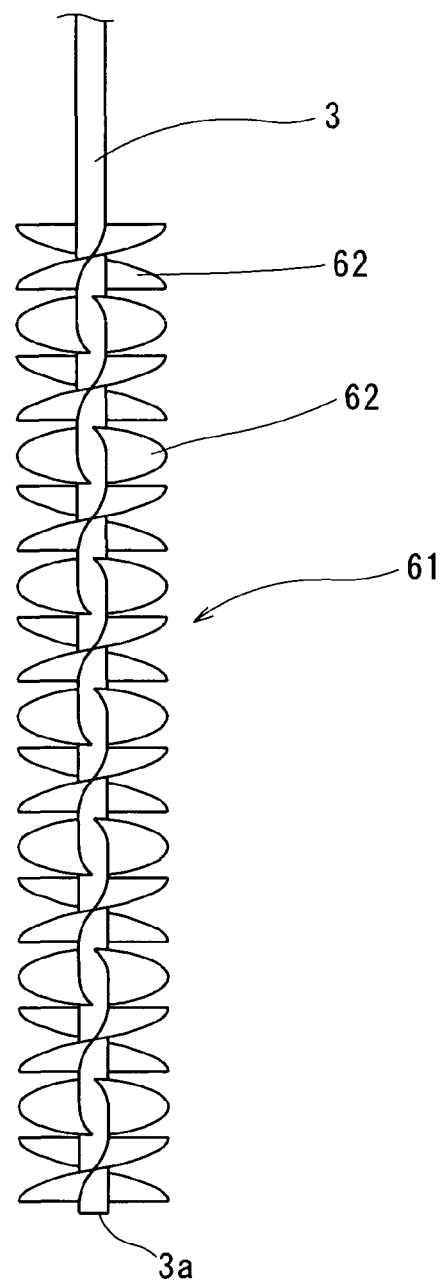
FIG. 6 is a front view showing a center tube having a modified fin used in a manufacturing apparatus for trichlorosilane according to the present invention.
Figure 7:
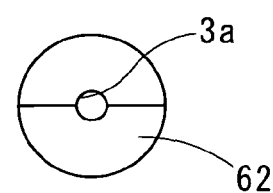
FIG. 7 is a bottom view of FIG. 6.

FIGS. 6 and 7 show modifications of fins of a trichlorosilane manufacturing apparatus according to the present invention.

Fin 61 forms a construction of a static mixer. That is, the fin 61 is formed from a plurality of fin elements 62 which are formed by twisting substantially rectangular plates clockwise or counterclockwise so that one end of the plate rotates 180° with respect to the other end. The fin elements 62 having the different twisted-directions are arranged alternately along the longitudinal direction, and the phases thereof are alternately shifted by 90°. The fin 61 having a static mixer formation stirs and mixes fluid by a mixture effect of: a dividing effect in which the fluid is divided in two by passing one fin element 62; a mixing effect (or a conversion effect) in which the fluid is moved along the twisted surface from the center toward the outside or from the outside toward the center; and a reversing effect in which the rotation direction is reversed by one fin element 62 so that the fluid is stirred.

The stirring and mixing in the reaction chamber 4 can be operated efficiently by providing the fin 61 having the static mixer formation around the center tube 3. As a result, it is possible to improve the reaction efficiency.

In the fin 61 of static mixer formation, at least two fin elements 62 are necessary since the fin elements 62 are arranged by 90° different position. It is preferable that 5 to 20 fin elements 62 be provided according to volume of the decomposition furnace.

Figure 8:
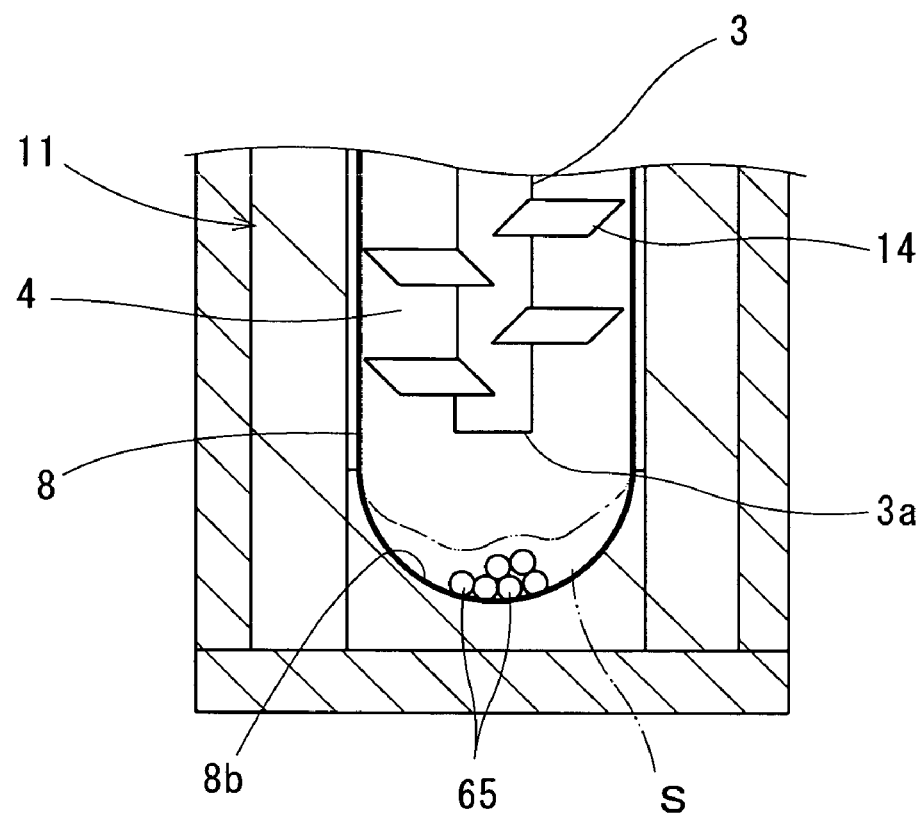
FIG. 8 is a vertical sectional view showing an essential portion of an example in which rolling members are provided in the decomposition furnace of the manufacturing apparatus for trichlorosilane of FIG. 1.

In trichlorosilane manufacturing apparatuses of the above-mentioned embodiments, as shown in FIG. 8, a plurality of spherical rolling members 65 made of stainless steel or the like may be provided on the inner-bottom portion of the furnace body 8. In this case, the rolling members 65 can be rolled on the inner-bottom surface 8b of the furnace body 8 by inserting a rod-like tool into the center tube 3 from the upper portion. Accordingly, the silicon oxide S can certainly be broken by the rolling motion.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the fin is fixed to the outer peripheral surface of the center tube in the above embodiments. However, the fin may be fixed to the inner peripheral surface of the furnace body so as to form a space between the fin and the center tube.

Further, holes along the injection direction of the pressurized gas may be formed on the fin 14 existing in the injection direction so that the injected gas from the pressurized-gas injection pipe 23 can easily reach the inner-bottom surface 8b of the furnace body 8

The polymer-supply pipe and the hydrogen-chloride-supply pipe may be individually connected to the furnace body as the first embodiment. Also, the polymers and hydrogen chloride may be supplied to the furnace body while being mixed as the second embodiment. In the present invention, the pipe supplying the polymers and hydrogen chloride individually and the pipe supplying the polymers and hydrogen chloride with mixing are all called as "raw-material-supply pipes".

Further, the discharge pipe of the furnace fluid for discharging the silicon oxide is provided on the end plate in the above-mentioned embodiments. However, the discharge pipe may be provided on the bottom portion of the furnace body.

In the above embodiments, the fin elements which form the fin are arranged continuously; however, the fin elements may be arranged intermittently, and may have a linear shape, or a pipe shape. For example, the fin may be provided by arranging a plurality of flat plates along a longitudinal direction of the furnace body with intervals. In this case, it is preferable that the adjacent plates be rotated with each other by a predetermined angle so that the plates are overlapped vertically at a part thereof.

What is claimed is:

1. An apparatus for manufacturing trichlorosilane by decomposition reacting polymers with hydrogen chloride at a high temperature, the apparatus comprising:
   a decomposition furnace into which the polymers including high-boiling chlorosilanes generated in a polycrystalline silicon manufacture process, a trichlorosilane manufacture process, or a conversion process and hydrogen chloride are introduced, the decomposition furnace comprising:
  a heating device which heats an interior of the decomposition furnace;
  a reaction chamber which is formed in the decomposition furnace;
  a center tube which is provided in the reaction chamber along a longitudinal direction of the reaction chamber and has a lower-end opening portion opposed to an inner-bottom surface of the decomposition furnace;
  a raw-material-supply pipe which supplies the polymer and the hydrogen chloride to an upper portion of the reaction chamber at an exterior of the center tube; and
  a gas-discharge pipe which leads out reacted gas from an upper end portion of the center tube;
the apparatus further comprising a fin which is formed integrally with at least one of an outer peripheral surface of the center tube or an inner peripheral surface of the decomposition furnace, and which leads the polymer and the hydrogen chloride to the lower-end opening portion of the center tube so as to stir the polymer and the hydrogen chloride,
a pressurized-gas injection pipe which injects a pressurized gas into the decomposition furnace; and
a discharge pipe which discharges a fluid in the decomposition furnace purged by the pressurized gas.

2. An apparatus for manufacturing trichlorosilane by decomposition reacting polymers with hydrogen chloride at a high temperature, the apparatus comprising:
  a decomposition furnace into which the polymers including high-boiling chlorosilanes generated in a polycrystalline silicon manufacture process, a trichlorosilane manufacture process, or a conversion process and hydrogen chloride are introduced, the decomposition furnace comprising:
    a heating device which heats an interior of the decomposition furnace;
    a reaction chamber which is formed in the decomposition furnace;
    a center tube which is provided in the reaction chamber along a longitudinal direction of the reaction chamber and has a lower-end opening portion opposed to an inner-bottom surface of the decomposition furnace;
    a raw-material-supply pipe which supplies the polymer and the hydrogen chloride to an upper portion of the reaction chamber at an exterior of the center tube;
    a gas-discharge pipe which leads out reacted gas from an upper end portion of the center tube, and
    a plurality of rolling members which are provided at an inner-bottom portion of the reaction chamber; and
  the apparatus further comprising a fin which is formed integrally with at least one of an outer peripheral surface of the center tube or an inner peripheral surface of the decomposition furnace, and which leads the polymer and the hydrogen chloride to the lower-end opening portion of the center tube so as to stir the polymer and the hydrogen chloride.

* * * * *